US 8,881,546 B2

(12) United States Patent
Guerra

(10) Patent No.: US 8,881,546 B2
(45) Date of Patent: Nov. 11, 2014

(54) SELF-ADAPTING MULTI-STAGE ABSORPTION HEAT PUMP

(76) Inventor: Marco Guerra, Bergamo (IT)

( * ) Notice: Subject to any disclaimer, the term of this patent is extended or adjusted under 35 U.S.C. 154(b) by 553 days.

(21) Appl. No.: 13/315,139

(22) Filed: Dec. 8, 2011

(65) Prior Publication Data

US 2012/0151960 A1 Jun. 21, 2012

(30) Foreign Application Priority Data

Dec. 15, 2010 (IT) .............................. MI2010A2290

(51) Int. Cl.
*F25B 15/02* (2006.01)
*F25B 15/04* (2006.01)

(52) U.S. Cl.
CPC ................ *F25B 15/02* (2013.01); *F25B 15/04* (2013.01); *F25B 2400/23* (2013.01); *Y02B 30/62* (2013.01)
USPC ................... 62/476; 62/493; 62/486; 62/495; 62/101; 62/512

(58) Field of Classification Search
CPC ........ F25B 15/02; F25B 15/04; F25B 15/008; F25B 2400/23
USPC ..................... 62/476, 486, 493, 495, 101, 512
See application file for complete search history.

(56) References Cited

U.S. PATENT DOCUMENTS

| 3,440,832 | A | * | 4/1969 | Aronson ......................... 62/101 |
| 4,023,375 | A | | 5/1977 | Chinnappa et al. |
| 4,337,625 | A | * | 7/1982 | Wilkinson ......................... 62/79 |
| 4,394,959 | A | * | 7/1983 | de Vries ......................... 237/2 B |
| 5,490,393 | A | * | 2/1996 | Fuesting et al. ................. 62/101 |
| 5,799,502 | A | * | 9/1998 | Nomura et al. ................... 62/476 |
| 5,910,160 | A | * | 6/1999 | Cakmakci et al. ............... 62/195 |
| 6,598,415 | B2 | * | 7/2003 | Ichikawa et al. .............. 62/324.2 |
| 2002/0108390 | A1 | * | 8/2002 | Ichikawa et al. .............. 62/324.2 |

FOREIGN PATENT DOCUMENTS

| DE | 10108768 A1 | 9/2002 |
| EP | 1391668 A2 | 2/2004 |
| JP | 2006275354 | 10/2006 |
| WO | 03046449 A1 | 6/2003 |

OTHER PUBLICATIONS

T. Berlitz, H. Plank, and F. Ziegler, An Ammonia-water absorption refrigtor with a large temperature lift for combined heating and cooling, 1998, Elsevier Science, vol. 3, pp. 219-229.*
Berlitz et al., "An ammonia-water absorption refrigerator with a large temperature lift for combined heating and cooling," Int. J. Refrig., vol. 21, No. 3, pp. 219-229 (1998).
Search Report from European counter-part application No. MI 20102290.

* cited by examiner

*Primary Examiner* — Cassey D Bauer
*Assistant Examiner* — Meraj A Shaikh
(74) *Attorney, Agent, or Firm* — Novak Druce Connolly Bove + Quigg LLP

(57) ABSTRACT

An absorption heat pump including a generator or desorber which generates vapour from a first fluid fed to a first condenser, an evaporator provided downstream of the condenser, an outlet of the evaporator connected by a third line to an inlet of a mixer of a low pressure absorber connected to a suction side of a pump feeding solution to the generator. The generator having a poor solution outlet connected by a sixth line provided with at least one lamination valve to a poor solution inlet feeding the absorber. The second line is brought into heat exchange contact with the low pressure absorber and opens into a liquid/vapour separator feeding the evaporator via a third line, the vapour outlet of the separator opening into an intermediate pressure absorber unit.

14 Claims, 2 Drawing Sheets

SELF-ADAPTING MULTI-STAGE ABSORPTION HEAT PUMP

CROSS-REFERENCE TO RELATED APPLICATIONS

This application claims priority under 35 USC 119 from Italian Application No. MI2010A 002290, filed Dec. 15, 2010.

The present invention relates to a self-adapting multi-stage absorption heat pump.

Heat pumps for two-stage cycles are known, such as those described in the treatise "Evaluation of double lift-cycles for waste heat powered refrigeration" D. C. Erickson, J. Tang.

Absorption cycles of this type are advantageous because of their intrinsic capacity to be fed with low temperature heat compared with single effect cycles. For example, using H2O/NH3 the cycle can operate at about 50° C. less than an absorption cycle which is not multi-stage.

The drawback is that the cycle efficiency is about one half that of the single effect cycle. For this reason these cycles are also known as single-double effect two-stage.

To operate the cycle with lower temperatures at the generator, the liquid refrigerant leaving the condenser is split into two streams. One of these two liquid refrigerant streams goes to the evaporator; the other to an absorber which is cooled by the refrigerant evaporation, i.e. to an intermediate pressure evaporator (IPE), which serves to cool the low pressure absorber (LPA).

This type of refrigerant stream splitting generates two drawbacks which make the application of these cycles problematic.

The division into two refrigerant streams is typically a function of a) the splitter geometry, b) the refrigerant flow rates at the inlet and at the two outlets and c) the pressures at the inlet and at the two outlet branches.

The splitter can be optimized for a determined reference condition (thermal input to the generator, operating pressures and thermal loads at the evaporator or at the low pressure absorber) for an optimal refrigerant split between the two branches.

However under operating conditions different from optimization, the splitter splits the refrigerant differently in a manner not proportional to the requirements of the two downstream branches, resulting in cycle efficiency losses, which in certain cases are total.

For the same substantially hydraulic reasons, under cycle transient conditions, which arise very easily, for example as the condenser pressure varies (typically due to changing ambient temperature in the case of air condensed machines) or as the generator thermal input varies or as the evaporation pressure varies, periodic oscillations of the cycle conditions can be triggered, or instabilities induced by a "feedback" in the effect of refrigerant flow variations along the two splitter outlet branches.

Hence not only does the splitter cause efficiency losses when under conditions different from those for which the system is optimized, but in addition oscillation and instability of the general conditions can be triggered when under those very common conditions in which there is a rapid variation in the cycle pressure conditions such as to make control problematic, with an associated significant performance reduction and the possible attainment of limiting conditions for the cycle safety parameters, with consequent stoppage.

The instability problems derive from the fact that the refrigerant fed to evaporate at intermediate pressure to cool the absorber, whether it evaporates completely or remains partially liquid, is "lost" as useful refrigerant at the evaporator.

Moreover if the refrigerant quantity fed to cool the absorber is insufficient, in the sense that absorption is incomplete, the cycle is "cut" and hence the extent of its operative conditions is reduced.

A splitting system is required which is able to evaluate at each moment the exact refrigerant quantity needed and to exactly apportion it at each moment along one side and the other.

Both these factors (evaluation and apportioning) are very complex, if not virtually unattainable, even for an active mechanical splitting system (i.e. a motor, lamination valve, etc.).

An object of the present invention is to provide a multi-stage heat pump which is able to operate more stably and with greater efficiency under variable operating conditions.

These and other objects are attained by providing a multi-stage heat pump in accordance with the technical teachings of the accompanying claims.

Further characteristics and advantages of the invention will be apparent from the description of a preferred but non-exclusive embodiment of the heat pump, illustrated by way of non-limiting example in the accompanying drawings, in which.

Figure 1:
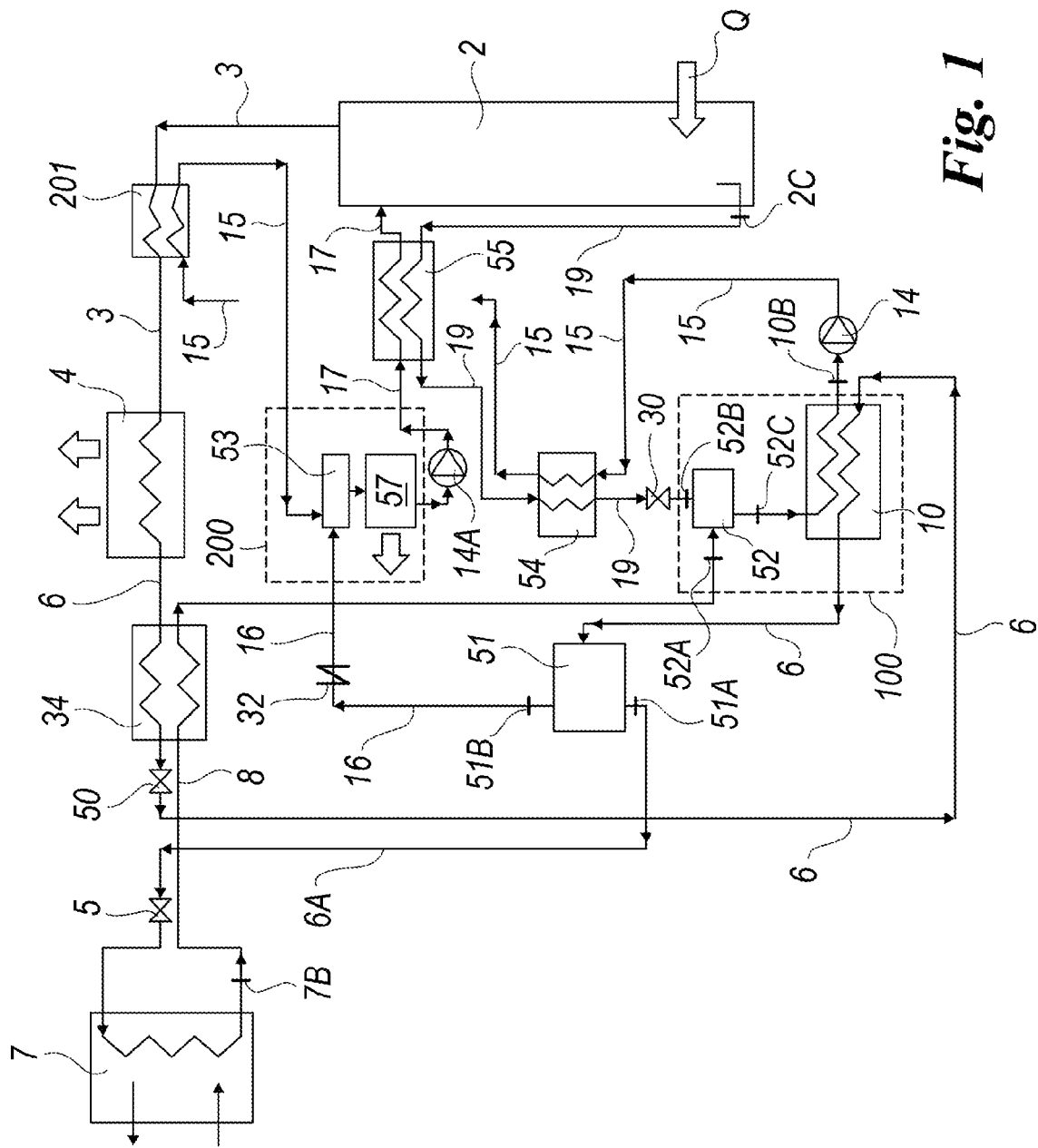
FIG. 1 shows a simplified scheme of the heat pump of the present invention.

With reference to said figures, these show a heat pump indicated overall by the reference numeral 1.

The heat pump illustrated in FIG. 1 operates with a cycle using as refrigerant a first fluid (in this specific case ammonia), which is absorbed in a second fluid (in this case water). The absorption heat pump comprises a conventional generator 2 or desorber which receives heat Q from a low temperature source (80-90° C.) which can be for example an internal combustion engine cooling circuit, a circuit heated by solar panels, industrial process water, etc.

The generator vapour outlet, advantageously via a rectifier 201, is connected by means of a first line 3 to a preferably air-cooled condenser 4.

The line 6 leaving the condenser 4 passes through a countercurrent heat exchanger 34 (optional), and is brought into heat exchange communication with a heat exchanger 10 present downstream of a lamination valve 50 provided in said line 6.

The fluid present in the line 6 (mixed vapour and liquid, depending on how much heat has been extracted by the heat exchanger 10) opens into a liquid/vapour separator 51.

The liquid/vapour separator presents a refrigerant liquid outlet 51A connected to a third line 6A, which via a lamination valve 5 connects the separator 51 to an evaporator 7 (which as its heat source can have air from the environment to be cooled).

An evaporator outlet 7B is connected by a third line 8 (possibly passing through the heat exchanger 34) to a vapour inlet 52A of a mixer 52. The mixer 52 comprises an outlet 52C for a liquid solution/vapour mixture connected to the heat exchanger 10, cooled by the refrigerant fluid. The mixer 52 and heat exchanger 10 in fact act as the low pressure absorber unit 100.

An outlet 10B of the heat exchanger 10 is connected to the suction side of a pump 14, from the delivery side of which a fourth line 15 extends to open into a further mixer 53.

The line 15 downstream of the pump passes through an intermediate pressure regenerative recuperator 54, then undergoes heat exchange with the rectifier 201 (if provided) from which the rich ammonia solution subtracts heat to facilitate water vapour condensation.

Via a non-return valve 32 a fifth line 16 connects a vapour outlet 51B of the separator 51 to a vapour inlet of the further mixer 53, which introduces the liquid solution/vapour mixture into the heat exchanger 57 of the intermediate pressure absorber which transfers heat to the outside. The mixer 53 and the heat exchanger 57 act as the medium pressure absorber unit 200.

An outlet of the intermediate pressure absorber 200 is associated with the suction side of a second pump 14A, the delivery side being connected to an eighth line 17 opening into the generator 2 after undergoing heat exchange with a high pressure regenerator 55 if provided.

At the base of the generator 2 an outlet 2C is provided from which an ammonia-poor solution is fed, via a sixth line 19 provided with at least one lamination valve 30, to a poor solution inlet 2B of the mixer 52.

If provided, the poor solution present in the sixth line exchanges heat with the regenerator 54.

The operation of the invention is evident to an expert of the art and will therefore not be described.

According to the invention, the liquid refrigerant split is completely avoided by passing the entire flow into the heat exchanger 10, where part of the refrigerant evaporates because of the thermal load on the absorber, to then pour both the vapour and the remaining refrigerant part into a separator vessel 51 from which the vapour fraction is fed to the intermediate pressure absorber 200 and the liquid fraction is brought to the evaporation pressure (lamination 5) and fed to the evaporator 7.

The general cycle operation does not change but the splitter is dispensed with, and the refrigerant quantity for cooling the absorber 10 (which subtracts refrigerant useful for the evaporator—but is essential to be able to operate the cycle with very small thermal lifts) "self-adapts" on the basis of the load to be subtracted at the absorber.

Essentially, the thermal load on the absorber 10, i.e. the heat to be dissipated by the refrigerant which cools it, is mainly given by the heat produced in the process of absorbing the vapour in the liquid, and in a minimum part by the liquid sensible cooling process.

Hence in the passage of the total refrigerant through the heat exchanger 10 of the absorber unit 100, only a fraction evaporates, equal as a first approximation to the heat of absorption, while the remaining liquid fraction is totally available for the evaporator 7.

The liquid is separated in 51, in the simple process of separating the two liquid and vapour phases in the subsequent separator. Essentially the vessel 51 has a volume and cross-section such as to enable the liquid phase to separate at the bottom and the vapour phase at the top by gravity.

Hence the refrigerant "consumption" for the absorber is always that which serves for the absorption, and if under certain conditions the heat of absorption tends to zero (no vapour to be absorbed) the refrigerant consumption would be nearly zero (only the sensible cooling heat).

Hence the problems encountered in the known art are overcome, and in addition under favourable conditions in which the need for double effect tends to diminish, the single-double effect multi-stage cycles tend to approach the single effect cycle, i.e. to have much greater efficiency.

Figure 2:
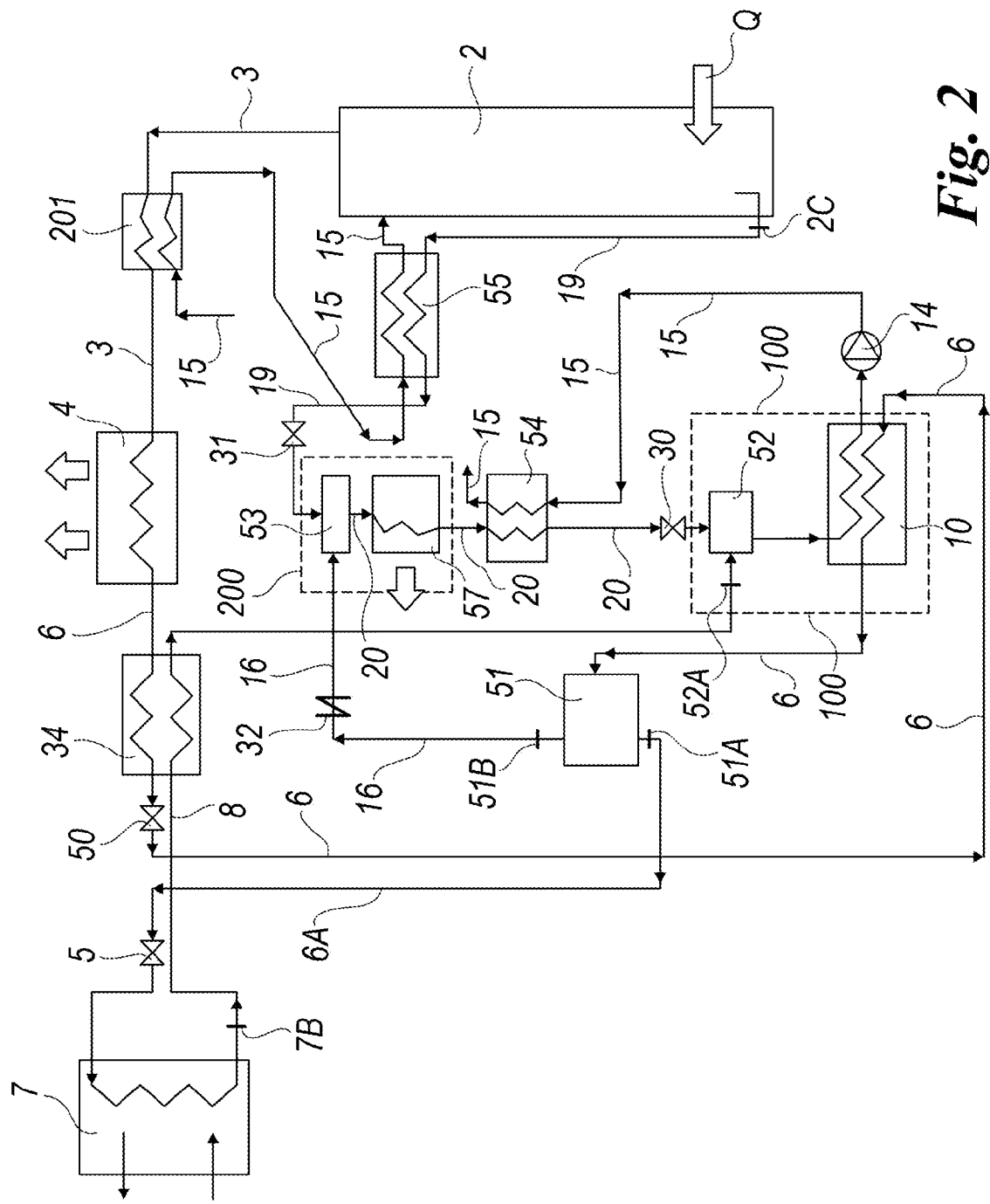
FIG. 2 shows a different embodiment of the present invention.

In contrast to that shown in FIG. 1, the embodiment of FIG. 2 presents only one pump 14 which alone achieves the necessary pressure lift.

Those structural parts similar to the two plants are indicated by the same reference numerals already used to describe FIG. 1. These will not be further described.

The structural circuit modifications are evident from FIG. 2. Essentially the fourth line 15, instead of opening into the further mixer 53, opens directly into the generator 2. Both the regenerator 201 and the high pressure recuperator 55 and low pressure recuperator 54 can also obviously be provided in this case in the line 15.

The poor solution sixth line 19 leaving the generator 2 opens into the mixer 53, downstream of which a further heat exchanger 57 is provided. The combined mixer 53 and heat exchanger 57, which transfers heat to the outside, acts as an intermediate pressure absorber 200. The line 19 passes optionally, upstream of the absorber 200, from the high pressure recuperator 55. A lamination valve 31, provided upstream of the mixer 53, balances the liquid pressure in the line 19 with that set by the valve 50.

A rich solution outlet from the mixer 53 is connected by a seventh line 20 to the mixer 52, in which the lamination valve 30 is provided. This line, in which the heat exchanger 57 is present, exchanges heat with the low pressure recuperator 54 (if provided).

The operation of the invention is evident to an expert of the art and will therefore not be described.

Various embodiments of the invention have been described, however others can be conceived by utilizing the same inventive principle. All the described components can be replaced by technically equivalent elements. Moreover the refrigerant and the liquid in which it is absorbed can be chosen at will in accordance with the necessary technical requirements.

The new idea is basically applicable to any multi-stage cycle in which the known art comprises a refrigerant split. According to the invention, the cycle is modified by eliminating the refrigerant split and causing all the refrigerant to pass to the low pressure absorber or, if preferred, to the intermediate pressure absorber, which is the other side of the same heat exchanger.

A liquid/vapour separator has also to be added, in which the vapour line goes to the intermediate pressure absorber and the liquid proceeds to the evaporator.

The invention claimed is:

1. An absorption heat pump comprising:
 a generator or desorber which generates vapour from a first fluid, a first line for feeding the vapor to a first condenser in heat exchange contact with a transmission fluid,
 downstream of the condenser a second line being provided for feeding refrigerant liquid into a liquid/vapor separator,
 upstream of the evaporator a first thermal expansion valve is provided,
 an outlet of the evaporator being connected by a third line to a vapor inlet of a first mixer that is part of a low pressure absorber unit,
 the absorber unit comprising an enriched solution outlet connected to a suction side of a pump,
 the delivery side of the pump is connected to the generator by a fourth line for feeding solution,
 the generator comprising a poor solution outlet connected by a sixth line provided with at least one thermal expansion valve to a poor solution inlet feeding the absorber, the second line is brought into heat exchange contact with the low pressure absorber and comprises a thermal expansion valve upstream of the low pressure absorber,
a separator liquid outlet feeding the evaporator via an evaporator feed line, the vapour outlet of the separator opening into an intermediate pressure absorber unit via a fifth line; wherein an outlet of the intermediate pressure absorber is connected to a suction side of a second pump, the delivery side of the second pump is connected to an eighth line opening into the generator, the fourth line opening into a second mixer and then into a first heat exchanger, wherein the intermediate pressure absorber unit comprises the second mixer and the first heat exchanger.

2. An absorption heat pump comprising: a generator or desorber which generates vapour from a first fluid, a first line for feeding the vapor to a first condenser in heat exchange contact with a transmission fluid, downstream of the condenser a second line being provided for feeding refrigerant liquid into a liquid/vapor separator, upstream of the evaporator a first thermal expansion valve is provided, an outlet of the evaporator being connected by a third line to a vapor inlet of a first mixer that is part of a low pressure absorber unit, the absorber unit comprising an enriched solution outlet connected to a suction side of a pump, the delivery side of the pump is connected to the generator by a fourth line for feeding solution, the generator comprising a poor solution outlet connected by a sixth line provided with at least one thermal expansion valve to a poor solution inlet feeding the absorber, the second line is brought into heat exchange contact with the low pressure absorber and comprises a thermal expansion valve upstream of the low pressure absorber, a separator liquid outlet feeding the evaporator via an evaporator feed line, the vapor outlet of the separator opening into an intermediate pressure absorber unit via a fifth line, wherein a sixth line opens into the intermediate pressure absorber, the intermediate pressure absorber outlet being connected by a seventh line provided with a thermal expansion valve to the inlet of the low pressure absorber.

3. The heat pump as claimed in claim 1, wherein the fourth line and the sixth line are brought into heat exchange communication via a second heat exchanger acting as a low pressure regenerator.

4. The heat pump as claimed in claim 1, wherein the sixth line and the eighth line are brought into heat exchange communication via a second heat exchanger acting as a high pressure regenerator.

5. The heat pump as claimed in claim 2, wherein the fourth line and the sixth line are brought into heat exchange communication via a first heat exchanger acting as a high pressure regenerator.

6. The heat pump as claimed in claim 2, wherein the fourth line and the seventh line are brought into heat exchange communication via a heat exchanger for acting as a low pressure regenerator.

7. The heat pump as claimed in claim 1, wherein the second line and the third line are brought into heat exchange communication via a second heat exchanger.

8. The heat pump as claimed in claim 1, wherein a non-return valve is provided in the fifth line.

9. A method for increasing the stability and efficiency of a multi-stage heat pump, comprising: providing an absorption heat pump comprising:
a generator or desorber which generates vapor from a first fluid, a first line for feeding the vapor to a first condenser in heat exchange contact with a transmission fluid,
downstream of the condenser a second line being provided for feeding refrigerant liquid into a liquid/vapor separator,
upstream of the evaporator a first thermal expansion valve is provided,
an outlet of the evaporator being connected by a third line to a vapor inlet of a first mixer that is part of a low pressure absorber unit,
the absorber unit comprising an enriched solution outlet connected to a suction side of a pump,
the delivery side of the pump is connected to the generator by a fourth line for feeding solution,
the generator comprising a poor solution outlet connected by a sixth line provided with at least one thermal expansion valve to a poor solution inlet feeding the absorber,
the second line is brought into heat exchange contact with the low pressure absorber and comprises a thermal expansion valve upstream of the low pressure absorber,
a separator liquid outlet feeding the evaporator via an evaporator feed line, the vapor outlet of the separator opening into an intermediate pressure absorber unit via a fifth line;
wherein an outlet of the intermediate pressure absorber is connected to a suction side of a second pump,
the delivery side of the second pump is connected to an eighth line opening into the generator, the fourth line opening into a second mixer and then into a first heat exchanger, wherein the intermediate pressure absorber unit comprises the mixer and the first heat exchanger;
lowering the pressure of a refrigerant liquid leaving the condenser,
cooling the low pressure absorber with this liquid,
in the separator separating the fluid which has cooled the low pressure absorber into a separator liquid stream and a separator vapor stream, and
directing the separator liquid stream towards the evaporator and the separator vapor stream towards the intermediate pressure absorber unit.

10. The method as claimed in claim 9, wherein the refrigerant is split into two streams by separating the liquid phase from the vapour phase at an intermediate pressure.

11. The heat pump as claimed in claim 2, wherein the second line and the third line are brought into heat exchange communication via a heat exchanger.

12. The heat pump as claimed in claim 2, wherein a non-return valve is provided in the fifth line.

13. A method for increasing the stability and efficiency of a multi-stage heat pump, comprising: providing an absorption heat pump comprising:
a generator or desorber which generates vapor from a first fluid, fed through a first line for feeding the vapor to a first condenser in heat exchange contact with a transmission fluid,
downstream of the condenser a second line being provided for feeding refrigerant liquid into a liquid/vapor separator,
upstream of the evaporator a first lamination thermal expansion valve is provided,
an outlet of the evaporator being connected by a third line to a vapor inlet of a first mixer that is part of a low pressure absorber unit,
the absorber unit comprising an enriched solution outlet connected to a suction side of a pump,
the delivery side of the pump is connected to the generator by a fourth line for feeding solution, the generator comprising a poor solution outlet connected by a sixth line provided with at least one lamination thermal expansion valve to a poor solution inlet feeding the absorber, the second line is brought into heat exchange contact with the low pressure absorber and comprises a lamination thermal expansion valve upstream of the low pressure absorber, a separator liquid outlet feeding the evaporator via an evaporator feed line, the vapor outlet of the separator opening into an intermediate pressure absorber unit via a fifth line, wherein a sixth line opens into the intermediate pressure absorber, the intermediate pressure absorber outlet being connected by a seventh line provided with a lamination thermal expansion valve to the inlet of the low pressure absorber, lowering the pressure of a refrigerant liquid leaving the condenser, cooling the low pressure absorber with this liquid, in the separator separating the fluid which has cooled the low pressure absorber into a separator liquid stream and a separator vapor stream, and directing the separator liquid stream towards the evaporator and the separator vapor stream towards the intermediate pressure absorber unit.

14. The method as claimed in claim 13, wherein the refrigerant is split into two streams by separating the liquid phase from the vapor phase at an intermediate pressure.

* * * * *